(12) United States Patent
Wilkens et al.

(10) Patent No.: US 6,539,851 B1
(45) Date of Patent: Apr. 1, 2003

(54) ROUND BALER

(75) Inventors: Dieter Wilkens, Wolfenbüttel-Ahlum (DE); Joost Honhold, Wolfenbüttel (DE)

(73) Assignee: Lely Welger Maschinenfabrik GmbH, Wolfenbuttel (DE)

( * ) Notice: Subject to any disclaimer, the term of this patent is extended or adjusted under 35 U.S.C. 154(b) by 256 days.

(21) Appl. No.: 09/585,963

(22) Filed: Jun. 2, 2000

(51) Int. Cl.[7] ................................................. B30B 9/00
(52) U.S. Cl. .......................................... 100/88; 56/341
(58) Field of Search ............................. 100/88, 87, 29, 100/32, 34; 56/341

(56) References Cited

U.S. PATENT DOCUMENTS

| | | | |
|---|---|---|---|
| 4,389,930 A | | 6/1983 | Rutschilling |
| 4,407,190 A | * | 10/1983 | Cheatum ..................... 100/88 |
| 4,889,047 A | * | 12/1989 | Ardueser et al. ............. 100/87 |
| 4,956,968 A | * | 9/1990 | Underhill ..................... 100/88 |
| 5,595,409 A | * | 1/1997 | Fier et al. .................... 292/112 |
| 5,598,690 A | * | 2/1997 | McClure et al. .............. 100/88 |

FOREIGN PATENT DOCUMENTS

| | | |
|---|---|---|
| DE | 2517340 | 10/1976 |
| DE | 3118663 | 12/1982 |
| DE | 9751985 | 5/1999 |
| FR | 2663191 | 12/1991 |

* cited by examiner

*Primary Examiner*—Allen Ostrager
*Assistant Examiner*—Shelley Self

(57) ABSTRACT

A round baler, including a front housing, a rear housing pivotally connected with the front housing by an upper axle secured in the front housing and supporting the rear housing for a pivotal movement relative to the front housing, and a locking device for latching the rear housing to the front housing in a closed operational position of the rear housing and releasable upon a pressure acting on the rear housing reaching a predetermined value, and including an element for latchingly connecting the rear housing with the front housing in a partially open position of the rear housing.

4 Claims, 3 Drawing Sheets

ROUND BALER

BACKGROUND OF THE INVENTION

1. Field of the Invention

The present invention relates to a round baler including a front housing, a rear housing pivotally connected with the front housing, an upper axle secured in the front housing and supporting the rear housing for a pivotal movement relative to the front housing, and locking means for latching the rear housing to the front housing in a closed operational position of the rear housing and releasable upon a pressure acting on the rear housing reaching a predetermined value.

2. Description of the Prior Art

German Publications DE 24 43 838A1 and DE 31 18 663A1 disclose mechanical locking devices for latching the front and rear housings. The rigid latching insures obtaining of high compression densities and uniform diameters of bales. In order to protect the drives of the compression elements and the compression elements themselves from overload, conventionally, a safety shear bolt, a friction clutch, or an automatically actuated cam decoupler is used in the main drive train of the baler. The actuation of a tying device is effected usually manually or automatically upon a predetermined pressure having been reached. The big drawback of balers equipped with the above-discussed over-load protection means consists in that when, upon shearing of the safety bolt, actuation of the friction or cam clutch, or upon sliding of the compression elements relative to a bale circumference, the bale remains, in particular at unfavorable crop conditions, in the compression chamber, the not yet tied bale cannot be set in rotation again without preliminary delatching the front and rear housings. Because of a large expansion force of the compressed material of the bale, the rear housing should be pivoted out by 30–50 cm. The large opening path of the rear housing results in that the bale has an overlarge diameter and cannot be tied up or can be tied up only partially. Practically, it means that it is necessary to compress the defective bale anew.

In a round baler produced by a firm Claas, type Rollant 66,46 silage 46 Roto Cut, pressure head 8/95, the front and rear housings are hydraulically latched. To protect the compression chamber from overload, a hydraulic overload protection device is provided which, upon the compression density exceeding a predetermined value, has its pressure limiting value actuated which results in bleeding of the oil off and in opening of the rear housing. The drawback of this type of protection consists in that the openings path of the rear housing is not limited, resulting in producing overlarge, not completely bound bales. There is no possibility of securing the rear housing in a closed position in which it would prevent an uncontrolled expansion of the bale. This is because the pressure limiting valve does not permit to obtain the necessary high closing pressure.

Accordingly, an object of the present invention is to provide a round baler which would insure finishing the formation of a bale, i.e., its tying up despite the stoppage of formation of the bale in the compression chamber, i.e., would insure tying of the bale and its ejection.

Another object of the present invention is to provide a round baler which would insure obtaining, after a stoppage of the baler, a bale diameter which is substantially the same as a bale diameter obtained during normal operation of the baler.

SUMMARY OF THE INVENTION

These and other objects of the present invention, which would become apparent hereinafter, are achieved by providing a round baler the locking means of which includes means for latchingly connecting the front and rear housings in a partially open position of the rear housing. Research and practice have shown that a small, limited opening of the housing by about from 20 to about 100 mm is sufficient to provide for resumption of rotation of a bale and maintaining the rotation during tying-up of the bale because the reduction of the load of the compression elements, the reduction of the rolling resistance of the bale, and multiple overrunning of the bale by the compression elements at insufficient delivery of the crop provide for reduction of the bale diameter. A further advantage of the present invention consists in that the rear housing can again be pulled to its initial closing position during the tying-up process. This is possible because the bale expands by a relatively small amount as a result of the small, limited opening of the rear housing.

A constructionally simple locking device, which permits both a limited opening of the rear housing and its closing, includes, in accordance with the present invention, a locking pawl and a latching member cooperating with the locking pawl and formed as a rotatable eccentric or a rotatable cam rotatable between a first position, in which the rear housing is connected with the front housing in the closed position of the rear housing, and a second position in which the rear housing is connected with the front housing in the partially open position of the rear housing. Alternatively, the locking pawl-supporting axle can be formed as a rotable eccentric or a rotable cam. The latching member can be rotate manually, electrically, or hydraulically and be so dimensioned that it would provide for an opening distance from about 20 mm to about 40 mm.

In accordance with another embodiment of a locking device of the present invention, the locking device includes two pairs of locking pawls provided on opposite sides of the compression chamber. A locking nose of one of the locking pawls of each pair of locking pawls is offset, in the opening direction of the rear housing, with respect to a locking nose of another of the locking pawls of the pair by a distance corresponding to a desired distance the rear housing is to be moved by into its partially open position. During the normal operation of the baler, the locking pawl with the offset locking nose is located outside of the operational region of the latching member. The locking pawl with the offset locking nose is brought into a position, in which it cooperates with the latching member, only during a defective operation. It engages the latching member after the first locking pawl has been released and the rear housing has been pivoted to its partially open position. The locking pawl with the offset locking nose is released after the formation of a bale, including tying-up, has been finished, thus providing for complete openings of the rear housing and ejection of the finished bale.

In a particular advantageous embodiment of locking device according to the present invention, there is provided means which displaces the rear housing after its partial opening into the original closed position. This permits to resume rotation of the bale after its stoppage and insures obtaining of a bale diameter corresponding to a predetermined bale diameter.

The novel features of the present invention, which are considered as characteristic for invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
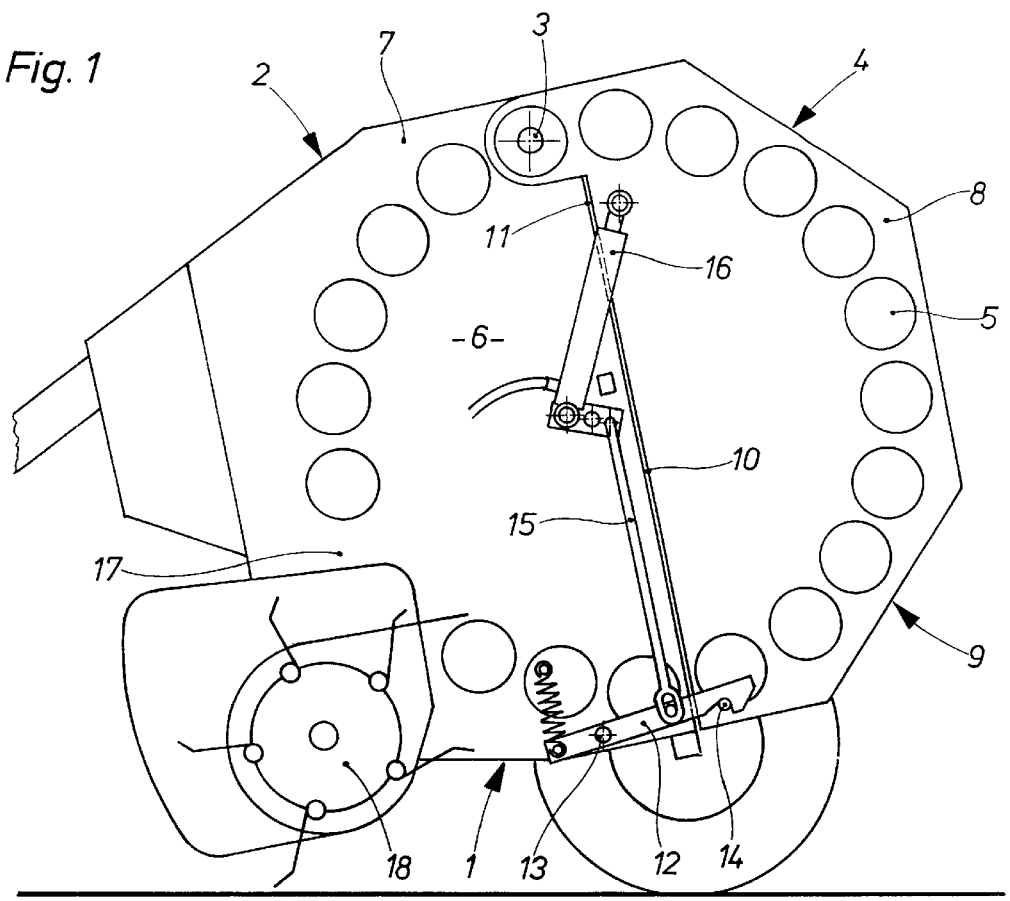
FIG. 1 shows a schematic side view of a round baler with a conventional locking device.

A round baler, which is shown in FIG. 1, includes a chassis I that carries or supports a cylindrical compression chamber housing. The compression chamber housing is formed of a front housing 2, which is fixedly secured to the chassis 1, and a rear housing 4. The rear housing 4 is pivotally connected with the front housing 2 by an upper axle 3 supported in the front housing 2. Radially, the compression chamber housing is formed by compression elements such as, e.g., belts or conveyor chains (not shown) or rolls 5 which are rotatably secured partially in the front housing 2 and partially in the rear housing 4. The rolls 5 limit a constant volume, compression chamber 6. Axially, the compression chamber housing is limited by front side walls 7 of the front housing 2, which are spaced from each other by a distance corresponding to the width of to-be-formed bales, and by rear side walls of the rear housing 4, which are likewise spaced from each other by a distance corresponding to the width of the to-be-formed bales. In a closed position of the rear housing 4 which is designated with a reference numeral 9, the front edges 10 of the rear side walls lie on the rear edges 11 of the front side walls 7. In the lower region, each side wall 7 is supported outside of a locking pawl 12, which is connected to the front side wall 7, on a bolt 13. Each locking pawl 12 engages a latching peg 14 secured to the rear housing 4. The locking pawls 12, thus, connect the front housing 2 with the rear housing 4. The release of the locking pawl 12 is effected with a connection rod 15, which is actuated by a hydraulic cylinder 16, to make pivoting of the rear housing 4 possible, in per se known manner.

For delivery of the to-be-released harvest product into the compression chamber the compression chamber housing has, in its front portion, a delivery slot 17. The harvest product is fed to the delivery slot 17 and subsequently into the compression chamber 6 by a pick-up drum 18. The harvest product is formed into a bale by the driven rolls 5.

Figure 2:
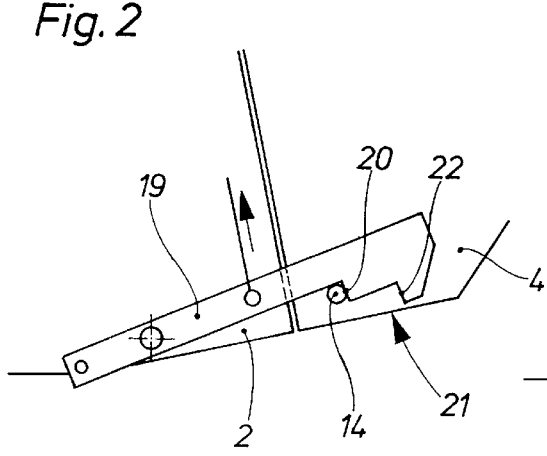
FIG. 2 shows a schematic side view of a major portion of a locking device according to the present invention in a closed operational position of the rear housing.
Figure 3:
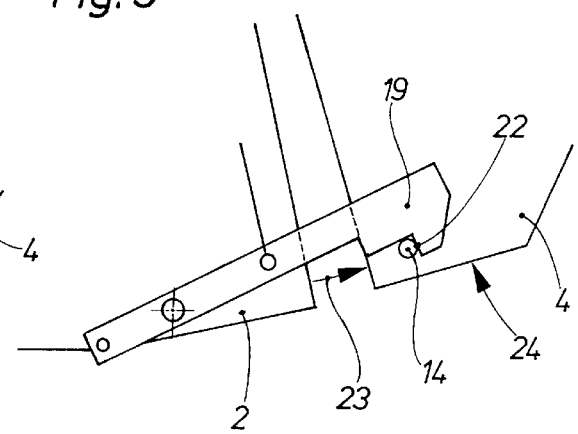
FIG. 3 shows a view similar to that of FIG. 2 in a partially open locking position of the rear housing.

As shown in FIG. 2, the locking pawl 19 of the locking device according to the present invention has, in addition to a first locking nose 20, which connects the front and rear housings 2 and 4 in the locking operational position of the rear housing designated with a reference numeral 21, a second locking nose 22 spaced from the first locking nose 21 in a rightward direction by from about 20 mm to about 100 mm, i.e., in an opening direction of the rear housing 4. The second locking nose 22 is offset downwardly with respect to the first locking nose 21. After the locking pawl 19 has been lifted off the latching peg 14, the rear housing 4 pivots automatically under pressure which is applied by a bale, which still remains in the compression chamber, into an opening direction 23 and is locked in a partially open position 24 by the second locking nose 22, as shown in FIG. 3. The partially open position of the rear housing 4 provides for rotation of the bale and its tying. After the second locking nose 22 is released, and the rear housing 4 is pivoted by about 90°, the bale is ejected. After the bale has been ejected, the rear housing 4 is pivoted in the opposite, closing direction and is locked in its locking operational position 21 by the first locking nose 20.

Figure 4:
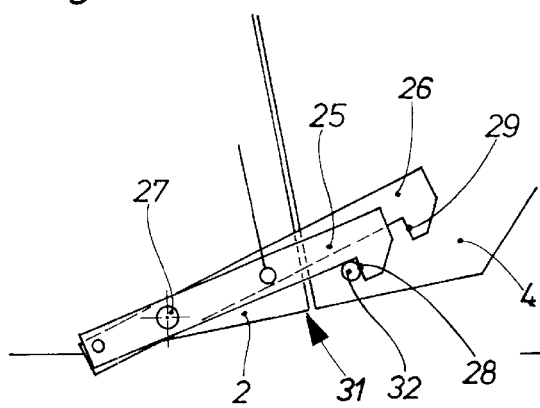
FIG. 4 shows a schematic side view of a major portion of another embodiment of a locking device according to the present invention in a closed operational position of the rear housing.

In the embodiment shown in FIG. 4, there is provided, in addition to a first locking pawl 25, a second locking pawl 26. The second locking pawl 26 is supported on a stationary peg 27 coaxially to the first locking pawl 25. The second locking pawl 26 project beyond the first locking pawl 25 by from about 20 mm to about 100 mm, i.e., it is longer than the first locking pawl 25 by that amount, as can be seen in FIG. 4. In the locking mechanism shown in FIG. 4, the first locking pawl has a first locking nose 28, and the second locking pawl 26 has a second locking nose 29, which is displaced, in the opening direction 30 of the rear housing 4, by from about 20 mm to about 100 mm, i.e., by an amount by which the length of the second locking pawl 26 exceeds the length of the first locking pawl 25. In the embodiment of FIG. 4, in its closed position 31, the rear housing 4 is connected with the front housing 2 by the first locking pawl 25. Actuation and holding means (not shown) holds the second locking pawl 26, during the normal operation of the baler, outside of the engagement region of the second locking pawl 26 with a latching peg 32 secured to the rear housing 4. The bale ejection takes place upon disengagement of the first locking pawl 25 from the latching peg 32 and upon pivoting of the rear housing by 90°.

Figure 5:
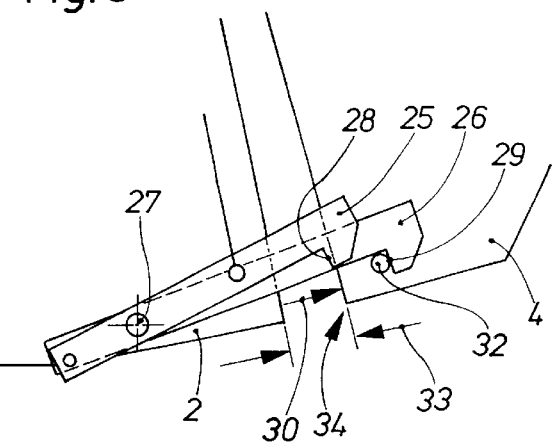
FIG. 5 shows a view similar to that of FIG. 4 in a partially open locking position of the rear housing.

If a bale remains in the compression chamber 6 during the operation of the baler, which is sensed by a suitable sensor or, in case a cam decoupling clutch is used, is signalized by an acoustic signal (rattle), or by non-feed in the pick-up region, the delivery of the crop is stopped, the second locking pawl is brought in the same position as the first locking pawl 25 and the first locking pawl 25 is disengaged from the latching peg 32, see FIG. 5. Upon the disengagement of the first locking pawl 25 from the latching peg 32, the rear housing 4 pivots in the opening direction 30 by a distance 33 and is held in the partially open position 34 by the second locking pawl 26 the locking nose 29 of which engages the latching peg 32. Upon actuation of the baler drive, the rotation of the bale resumes, it is tied up, and upon disengagement of the second locking pawl 26 from the latching peg 32 and opening of the rear housing 4, the tied bale is ejected from the compression chamber 6.

Figure 6:
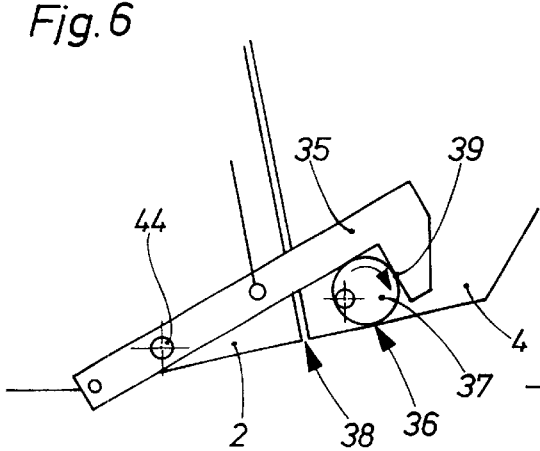
FIG. 6 shows a schematic side view of a major portion of yet another embodiment of a locking device according to the present invention in a closed operational position of the rear housing.
Figure 7:
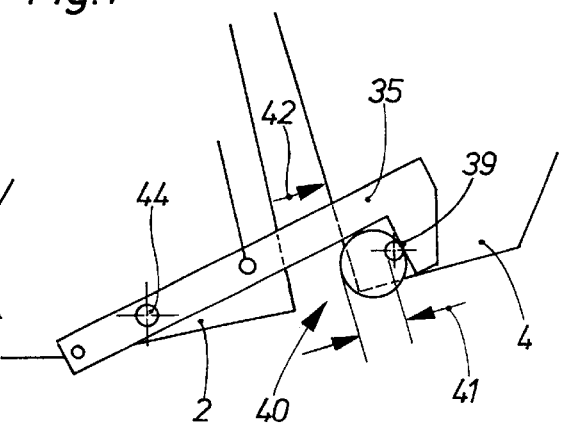
FIG. 7 shows a view similar to that of FIG. 6 in a partially open locking position of the rear housing.

In the embodiment shown in FIGS. 6, 7, a locking pawl 35 cooperates with a latching member formed as a rotatable eccentric disc 36. As shown in FIG. 6, in the closed position of the rear housing 4, the eccentric portion 37 of the disc 36 is engaged by a locking nose 39 of the locking pawl 35. To provide for a partially open position 40 shown in FIG. 7, the eccentric disc 36 is rotated by 180°, whereby the rear housing 4 pivots in the opening direction 42 by an amount of the eccentricity 41. The actuation of the eccentric disc 36 can be effected manually, electrically, or hydraulically, e.g., when a baler includes a hydraulic cylinder (not shown).

Figure 8:
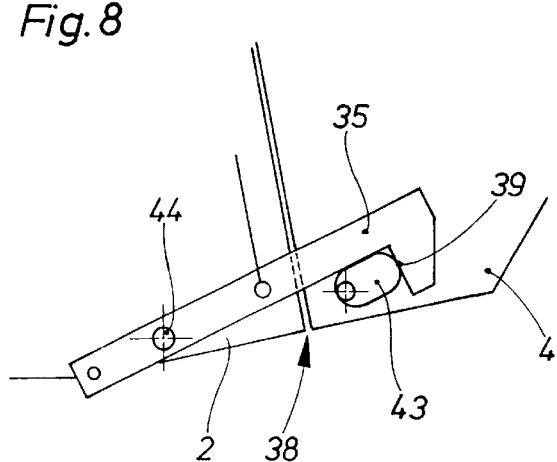
FIG. 8 shows a view similar to that of FIG. 6 of a modified embodiment of a locking device according to the present invention.

In the embodiment shown in FIG. 8, instead of the eccentric disc 36, a rotatable cam 43 is provided. The cam 43 functions in the same way as the eccentric disc 36. Alternatively, a locking pawl-supporting axle 44 can be formed as a rotatable eccentric disc or as a rotatable cam.

Figure 9:
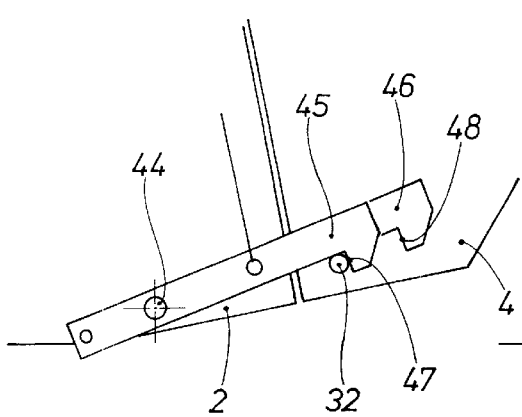
FIG. 9 shows a schematic side view of a major portion of a further embodiment of a locking device according to the present invention in a closed operational position of the rear housing.
Figure 10:
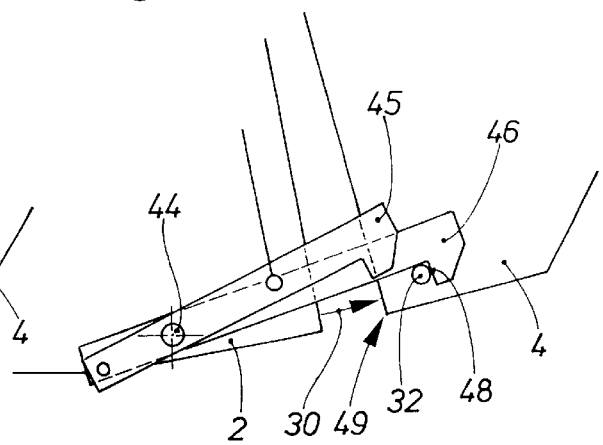
FIG. 10 shows a view similar to that of FIG. 9 in a partially open locking position of the rear housing.

In the embodiment shown in FIGS. 9–10, a first locking pawl 45 is, e.g., mechanically connected with a second locking pawl 46 having a locking nose 48 offset, in the opening direction of the rear housing 4, with respect to a locking nose 47 of the locking pawl 45.

During normal operation of the baler, both locking pawls 45, 46 pivot simultaneously, and only the first locking pawl 45 engages the latching peg 32 in the closed position of the rear housing 4. In case of a defective operation, the second locking pawl 46 is decoupled from the first locking pawl 45 and, after the disengagement of the first locking pawl 45 from the latching peg 32, engages the latching peg 32, as shown in FIG. 10, providing for retaining of the rear housing 4 in a partially open position 49.

Figure 11:
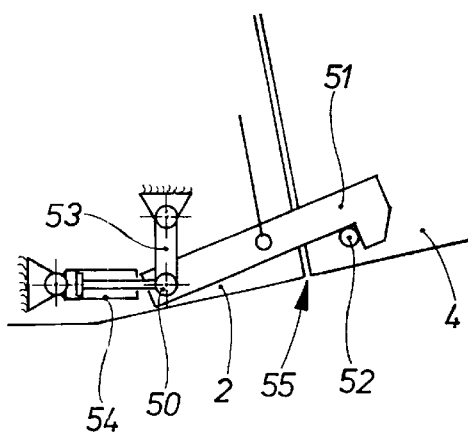
FIG. 11 shows a schematic side view of a major portion of a still further embodiment of a locking device according to the present invention in a closed operational position of the rear housing.
Figure 12:
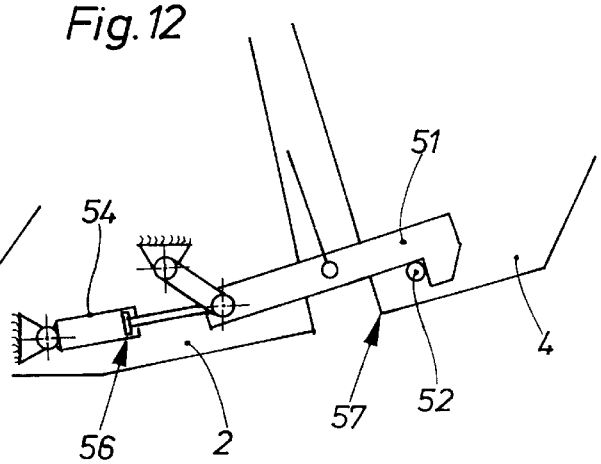
FIG. 12 shows a view similar to that of FIG. 11 in a partially open locking position of the rear housing.

In the embodiment shown in FIGS. 11–12, the support axle 50 of the locking pawl 41 is not stationary, but is pivoted or displaced by appropriate auxiliary means, e.g. by a hydraulic cylinder 54. Alternatively, the latching peg 52 can be made displaceable or pivotable. As shown in FIGS. 10–11, the locking pawl 51 is hingedly connected with the front housing 2 by a fishplate pair 53 and is connected with the double-action hydraulic cylinder 54. During the normal operation, a predetermined pressure, which is maintained in the hydraulic cylinder 54, provides for holding the front and rear housings 2 and 4 in their closed, operational position 55. The piston stroke of the hydraulic cylinder 54 is so selected that it can be changed within a range of 20–100 mm. In case of a defective operation, the pressure in the cylinder 54 is reduced, and the piston moves to its end position 56, a shown in FIG. 12, providing for pivoting of the rear housing 4 to its partially open position 57.

After the necessary pivotal movement of the bale, the rear housing 4 can be, in advantageous manner, pivoted back to its closed position by applying pressure to the rod side of the piston. Thereafter, tying of the bale takes place.

It is particularly advantageous to be able to sense the rotation of a bale or the actuation of an overload coupling, and effect automatically a partial opening and locking of the rear housing in response to a sensing signal, and, simultaneously, to output to a tractor driver an alarm signal indicating a defective operation.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A round baler, comprising a front housing; a rear housing pivotally connected with the front housing and forming therewith, in a closed operational position, a constant volume compression chamber; an upper axle secured in the front housing and supporting the rear housing for a pivotal movement relative to the front housing; and locking means for latching the rear housing to the front housing in a closed operational position of the rear housing and releasable upon a pressure acting on the rear housing reaching a predetermined value, the locking means including first means for latchingly connecting the rear housing with the front housing in a first partially open position of the rear housing, and second means for latchingly connecting the rear housing with the front housing in a second partially open position of the rear housing greater than the first partially open position.

2. A round baler as set forth in claim 1, wherein the locking means comprises a locking pawl, and a hydraulic cylinder for displacing the locking pawl between a first position, in which the rear housing is connected with the front housing in the closed position of the rear housing, and a second position in which the rear housing is connected with the front housing in the partially open position of the rear housing.

3. A round baler as set forth in claim 1, wherein a displacement path of a rear housing between the closed and partially open positions thereof amounts to from about 20 mm to about 100 mm.

4. A round baler as set forth in claim 1, comprising means for pulling the rear housing from the partially open position thereof into the closed position thereof.

* * * * *